US012795519B2

(12) United States Patent
Hong

(10) Patent No.: US 12,795,519 B2
(45) Date of Patent: Nov. 10, 2026

(54) CELL SELECTION METHOD FOR MULTI-CARD TERMINAL BASED ON TARGET CAPABILITY INFORMATION OF NEIGHBOR BASE STATION, APPARATUS, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 469 days.

(21) Appl. No.: 18/270,170

(22) PCT Filed: Dec. 28, 2020

(86) PCT No.: PCT/CN2020/140178
§ 371 (c)(1),
(2) Date: Jun. 28, 2023

(87) PCT Pub. No.: WO2022/140920
PCT Pub. Date: Jul. 7, 2022

(65) Prior Publication Data

US 2024/0089843 A1 Mar. 14, 2024

(51) Int. Cl.
*H04W 48/16* (2009.01)
*H04W 8/18* (2009.01)
(Continued)

(52) U.S. Cl.
CPC ....... *H04W 48/16* (2013.01); *H04W 36/0072* (2013.01); *H04W 36/08* (2013.01); *H04W 48/10* (2013.01); *H04W 88/06* (2013.01)

(58) Field of Classification Search
None
See application file for complete search history.

(56) References Cited

U.S. PATENT DOCUMENTS 6,128,490 A * 10/2000 Shaheen ............... H04W 48/18 455/434
8,811,339 B2 * 8/2014 Fong ................. H04W 36/0058 370/331
(Continued)

FOREIGN PATENT DOCUMENTS

CN 106488407 A 3/2017
CN 108886830 A 11/2018
(Continued)

OTHER PUBLICATIONS

International Search Report issued in Application No. PCT/CN2020/140178 dated Aug. 26, 2021, (4p).
(Continued)

*Primary Examiner* — Jenee Holland
(74) *Attorney, Agent, or Firm* — Arch & Lake LLP; Han Tan; Shen Wang

(57) ABSTRACT

A cell selection method includes: acquiring target capability information corresponding to at least one neighbor base station, wherein the target capability information indicates the capability to solve a problem of multiple cards of a multi-card terminal; and sending the target capability information corresponding to the at least one neighbor base station.

10 Claims, 4 Drawing Sheets

(51) Int. Cl.

| | |
|---|---|
| ***H04W 36/00*** | (2009.01) |
| ***H04W 36/08*** | (2009.01) |
| ***H04W 48/10*** | (2009.01) |
| ***H04W 48/12*** | (2009.01) |
| ***H04W 48/20*** | (2009.01) |
| ***H04W 88/06*** | (2009.01) |

(56) References Cited

U.S. PATENT DOCUMENTS

| | | | | |
|---|---|---|---|---|
| 10,009,808 | B2 | 6/2018 | Zhang | |
| 10,327,182 | B2 | 6/2019 | Zhang | |
| 2013/0070739 | A1 * | 3/2013 | McCann | H04W 48/16 370/338 |
| 2013/0183979 | A1 * | 7/2013 | Chen | H04W 36/0058 455/436 |
| 2014/0213244 | A1 * | 7/2014 | Oh | H04W 4/90 455/419 |
| 2015/0063331 | A1 * | 3/2015 | Scahill | H04W 48/20 370/338 |
| 2016/0174087 | A1 * | 6/2016 | Taylor | H04W 52/244 370/252 |
| 2018/0027460 | A1 | 1/2018 | Zhang | |
| 2018/0279191 | A1 | 9/2018 | Zhang | |
| 2020/0359279 | A1 * | 11/2020 | Yang | H04W 72/51 |
| 2021/0120524 | A1 * | 4/2021 | Palle | H04W 60/005 |
| 2021/0153005 | A1 * | 5/2021 | Ke | H04W 8/183 |
| 2021/0195684 | A1 * | 6/2021 | Sturek | H04W 84/18 |
| 2021/0400627 | A1 * | 12/2021 | Kwok | H04W 24/08 |
| 2022/0078877 | A1 * | 3/2022 | Lee | H04W 76/15 |
| 2022/0141699 | A1 * | 5/2022 | Yue | H04W 72/51 370/329 |
| 2022/0361058 | A1 * | 11/2022 | Shaheen | H04W 36/0058 |
| 2023/0047213 | A1 * | 2/2023 | Chen | H04W 36/0022 |
| 2023/0171811 | A1 * | 6/2023 | Fan | H04W 48/08 370/329 |
| 2023/0262563 | A1 * | 8/2023 | Krishne Gowda | H04W 8/20 370/331 |
| 2023/0262657 | A1 * | 8/2023 | Kim | H04W 68/02 455/458 |
| 2023/0300723 | A1 * | 9/2023 | Jose | H04W 48/12 455/434 |
| 2023/0308856 | A1 * | 9/2023 | Hong | H04L 47/00 |
| 2023/0337186 | A1 * | 10/2023 | Toskala | H04W 68/12 |
| 2023/0337202 | A1 * | 10/2023 | Pant | H04L 5/0053 |
| 2024/0089843 | A1 * | 3/2024 | Hong | H04W 48/20 |
| 2024/0381192 | A1 * | 11/2024 | Hong | H04W 36/0061 |
| 2025/0126588 | A1 * | 4/2025 | Velev | H04W 68/12 |
| 2025/0331003 | A1 * | 10/2025 | Chien | H04W 74/0808 |
| 2025/0338298 | A1 * | 10/2025 | Oteri | H04L 5/0094 |

FOREIGN PATENT DOCUMENTS

| | | | |
|---|---|---|---|
| CN | 110495208 | A | 11/2019 |
| CN | 110521236 | A | 11/2019 |
| CN | 111885663 | A | 11/2020 |

OTHER PUBLICATIONS

The First Office Action issue in Application No. CN202080004218.8, dated Aug. 24, 2022, with English translation, (19p).

ZTE Corporation, Sanechips, "Consideration on the Switching Notification", 3GPP TSG-RAN WG2 Meeting #112-e, R2-2009623, Online, Nov. 2-13, 2020, (7p).

* cited by examiner

CELL SELECTION METHOD FOR MULTI-CARD TERMINAL BASED ON TARGET CAPABILITY INFORMATION OF NEIGHBOR BASE STATION, APPARATUS, AND STORAGE MEDIUM

CROSS-REFERENCE OF RELATED APPLICATION

The present application is a U.S. National Stage of International Application No. PCT/CN2020/140178, filed on Dec. 28, 2020, the disclosure of which is incorporated herein by reference in its entirety for all purposes.

BACKGROUND

With the development of wireless communication technology, there are more and more multi-card terminals.

At present, the processing methods for multi-card terminals are mainly based on the implementation of various terminal manufacturers, and there is no unified standard for regulations, which leads to many different terminal behaviors and processing methods, such as dual-card single standby, dual-card dual standby single-pass, dual-card dual-standby dual-pass, etc.

SUMMARY

The present disclosure relates to the field of communications, and in particular, to cell selection method and apparatus, and storage medium.

According to a first aspect of the embodiments of the present disclosure, a cell selection method is provided. The method is applied to a base station, and includes: acquiring target capability information corresponding to at least one neighbor base station; wherein, the target capability information is configured to indicate the capability of solving the multi-card problem of the multi-card terminal; and sending the target capability information corresponding to the at least one neighbor base station.

According to a second aspect of the embodiments of the present disclosure, a cell selection method is provided. The method is applied to a multi-card terminal, and includes: receiving target capability information corresponding to at least one neighbor base station; wherein, the target capability information is configured to indicate the capability of solving the multi-card problem of the multi-card terminal; performing cell selection at least based on the target capability information.

According to a third aspect of the embodiments of the present disclosure, there is provided a cell selection apparatus. The apparatus is applied to a base station, and includes: an acquiring module, configured to acquire target capability information corresponding to at least one neighbor base station; wherein, the target capability information is configured to indicate the capability of solving the multi-card problem of the multi-card terminal; a sending module, configured to send the target capability information corresponding to the at least one neighbor base station.

According to a fourth aspect of the embodiments of the present disclosure, there is provided a cell selection apparatus. The apparatus is applied to a multi-card terminal, and includes: a receiving module, configured to receive target capability information corresponding to at least one neighbor base station; wherein, the target capability information is used to indicate the capability of solving the multi-card problem of the multi-card terminal; a cell selection module is configured to perform cell selection based on at least the target capability information.

According to a fifth aspect of the embodiments of the present disclosure, there is provided a computer-readable storage medium, where the storage medium stores a computer program, and the computer program is configured to execute the cell selection method according to any one of the foregoing first aspects.

According to a sixth aspect of the embodiments of the present disclosure, there is provided a computer-readable storage medium, where the storage medium stores a computer program, and the computer program is configured to execute the cell selection method according to any one of the foregoing second aspects.

According to a seventh aspect of the embodiments of the present disclosure, there is provided a cell selection apparatus, including: a processor; a memory for storing processor-executable instructions; wherein, the processor is configured to execute the cell selection method according to any one of the first aspect above.

According to an eighth aspect of the embodiments of the present disclosure, there is provided a cell selection apparatus, including: a processor; a memory for storing processor-executable instructions; wherein, the processor is configured to perform the cell selection method according to any one of the second aspect above.

It is to be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and together with the description serve to explain the principles of the present disclosure.

DETAILED DESCRIPTION

Figure 1:
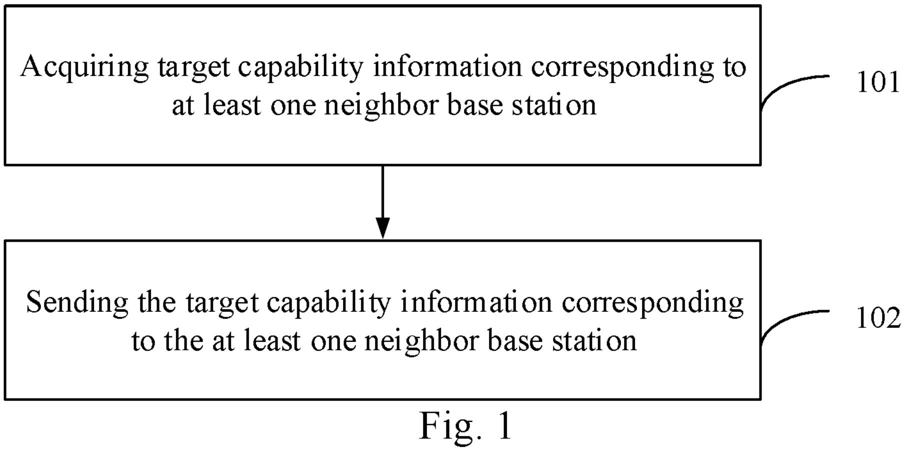
FIG. 1 is a schematic flowchart of a cell selection method according to an embodiment of the present disclosure.

Embodiments will be described in detail herein, examples of which are illustrated in the accompanying drawings. Where the following description refers to the drawings, the same numerals in different drawings refer to the same or similar elements unless otherwise indicated. The implementations described in the illustrative embodiments below are not intended to represent all implementations consistent with the present disclosure. Rather, they are merely examples of apparatus and methods consistent with some aspects of the disclosure as recited in the appended claims.

The terminology used in the present disclosure is for the purpose of describing particular embodiments only and is not intended to limit the present disclosure. As used in this disclosure and the appended claims, the singular forms "a," "the," and "the" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used in this disclosure to describe various pieces of information, such information should not be limited by these terms. These terms are only used to distinguish the same type of information from each other. For example, the first information may also be referred to as the second information, and similarly, the second information may also be referred to as the first information, without departing from the scope of the present disclosure. Depending on the context, the word "if" as used herein can be interpreted as "at the time of" or "when" or "in response to determining."

Different terminal behaviors and processing methods may lead to many multi-card problems in multi-card terminals. In the embodiments of the present disclosure, the multi-card terminal may have but not limited to the following multi-card problems:

Problem 1. When the multi-card terminal communicates with the first system through one of the SIM cards, the multi-card terminal needs to keep monitoring the second system, including but not limited to monitoring paging messages, performing system measurements, and reading the system messages etc. This may affect the communication performance of the first system.

Problem 2. The paging timing is calculated according to the terminal identifier, and the multi-card terminal has multiple SIM cards, so the corresponding paging timings between different SIM cards may be the same, resulting in systematic paging collisions.

Problem 3. When the multi-card terminal communicates with the first system through one of the SIM cards, the other SIM card monitors the paging message from the second system, and the multi-card terminal needs to decide whether to perform a paging response. At present, whether to perform a paging response is based on the rules configured by the user.

Problem 4: When the multi-card terminal determines to respond to the paging message of the second system, it needs to stop the service currently being performed in the first system. If there is no suspension mechanism for the current service, the multi-card terminal will automatically disconnect the RRC (Radio Resource Control) connection with the first system and leave the first system. After the multi-card terminal leaves the first system, the first system will continue to page the multi-card terminal, resulting waste of paging resources.

Problem 5. When the terminal reads paging or system measurement in the second system, it will cause a short interval in the first system, and the duration is generally about 20 ms (milliseconds), but for the first system, it is equivalent to experiencing shadow fading (in mobile communication, due to the shadow effect caused by obstacles, the received signal strength decreases, but the median value of the field strength changes slowly with geographical changes, also known as slow fading). Since a short interval occurs once in each paging cycle, the power control and link adaptation algorithms of the network may be affected, resulting waste of resources of the first system.

Problem 6. When the terminal determines to switch to the cell of the second system, it needs to read the system information in the second system, resulting in a long interval of the first system. The duration is generally about 1 second. The first system may consider the long interval as an error condition. In the related art, neither the base station nor the terminal can handle this situation.

Problem 7. In the process of the terminal performing TAU (Tracking Area Update) in the second system, a longer interval for the first system may be caused. The duration may reach several seconds, resulting in a greater impact on the first system.

In order to reduce the above-mentioned multi-card problem existing in the multi-card terminal and make the cell selection method more flexible, the present disclosure provides the following cell selection scheme.

First, the cell selection method provided by the present disclosure will be described from the base station side.

An embodiment of the present disclosure provides a cell selection method. Referring to FIG. 1, FIG. 1 is a flowchart of a cell selection method according to an embodiment, which can be used for a base station, the base station is a base station connected to a multi-card terminal, or a base station where the multi-card terminal resides, the method may include the following steps.

In step 101, target capability information corresponding to at least one neighbor base station is acquired.

In some embodiments of the present disclosure, the target capability information is used to indicate the capability of solving the multi-card problems of the multi-card terminal, and the multi-card problems include but are not limited to the above seven multi-card problems.

In some embodiments of the present disclosure, the base station and the neighbor base station may be base stations of the same standard, or base stations of different standards, which are not limited in the present disclosure. In an embodiment, the base station and at least one neighbor base station may be NR (New Radio) base stations. In another embodiment, the base station may be an NR base station, and at least one neighbor station may be an EUTRAN (Evolved Universal Terrestrial Radio Access Network) base station.

In this embodiment of the present disclosure, the base station may acquire target capability information corresponding to at least one neighbor base station through an inter-base station interface, including but not limited to an X2 or Xn interface.

In step 102, the target capability information corresponding to the at least one neighbor base station is sent.

In the above embodiment, the base station may acquire and send target capability information corresponding to at least one neighbor base station, wherein the target capability information may be used to indicate the capability of solving the multi-card problems of the multi-card terminal. The multi-card terminal can at least perform cell selection based on the target capability information corresponding to the neighbor base station. In the present disclosure, the multi-card problems of the multi-card terminal can be reduced, the cell selection method is more flexible, and the usability is high.

Figure 2:
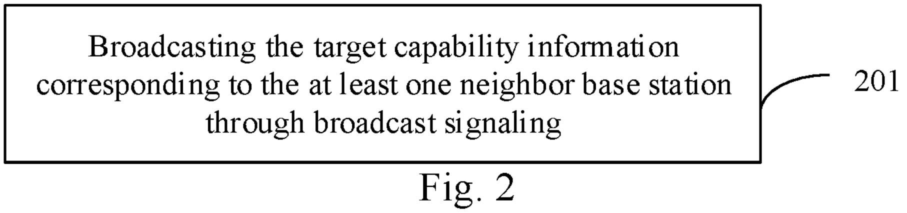
FIG. 2 is a schematic flowchart of another cell selection method according to an embodiment of the present disclosure.

In some embodiments, referring to FIG. 2, FIG. 2 is a flowchart of a cell selection method according to an embodiment, and the method may include the following steps.

In step 201, the target capability information corresponding to the at least one neighbor base station is broadcast through broadcast signaling.

In the embodiment of the present disclosure, regardless of whether the multi-card terminal is in a connected state, an idle state or an inactive state, the base station can broadcast the target capability information corresponding to the at least one neighbor base station through broadcast signaling. The multi-card terminal acquires target capability information corresponding to at least one neighbor base station by receiving broadcast signaling.

In the above embodiment, the base station can broadcast the target capability information corresponding to at least one neighbor base station through broadcast signaling, so that the multi-card terminal can subsequently perform cell selection at least according to the target capability information corresponding to the neighbor base station, which is easy to implement and has high availability.

In some embodiments, the broadcast signaling may be used to broadcast a target system message carrying target capability information corresponding to the at least one neighbor base station. The base station can send the target system message carrying the target capability information corresponding to at least one neighbor base station to the multi-card terminal through the broadcast signaling.

In some embodiments, the target system message broadcast by the base station includes but is not limited to at least one of the following: SIB (System Information Block) 3, SIB4, SIB5, and SIB11. The base station broadcasts a target system message carrying target capability information corresponding to at least one neighbor base station, so that the multi-card terminal can perform cell selection.

In an embodiment of the present disclosure, the base station can add target capability information corresponding to the neighbor base station by modifying the target system message. Taking the modification of SIB3 as an example, the following information can be added to SIB3.

```
--- ASN1START
--- TAG-SIB3-START
SIB3 ::=                      SEQUENCE {
...,
[[
Musimcapability-r17           MUSIMCapability-r17
OPTIONAL,   -- Need R
]]
}
```

The manner of adding the target capability information corresponding to the neighbor base station in other SIB is similar, and details are not repeated here.

In the above embodiment, the target system message can be modified to carry the target capability information corresponding to the neighbor base station, which is simple to implement and has high availability.

Figure 3:
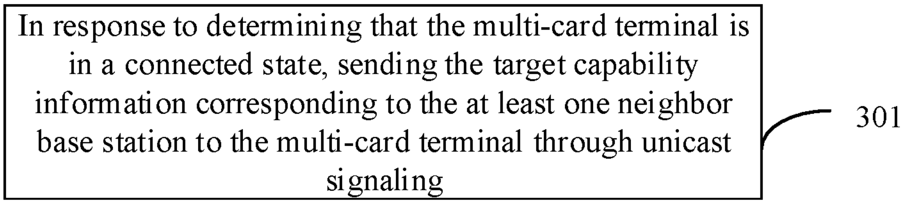
FIG. 3 is a schematic flowchart of another cell selection method according to an embodiment of the present disclosure.

In some embodiments, referring to FIG. 3, FIG. 3 is a flowchart of a cell selection method according to an embodiment, and the method may include the following steps.

In step 301, in response to determining that the multi-card terminal is in a connected state, the target capability information corresponding to the at least one neighbor base station is sent to the multi-card terminal through unicast signaling.

In the embodiment of the present disclosure, the base station may send the target capability information corresponding to at least one neighbor base station to the multi-card terminal through unicast signaling when it is determined that the multi-card terminal is connected to the base station, that is, the multi-card terminal is in the connected state.

In the above-mentioned embodiment, the base station may send the target capability information corresponding to at least one neighbor base station to the multi-card terminal through unicast signaling, so that the multi-card terminal can subsequently perform cell selection at least according to the target capability information corresponding to the neighbor base station, which is simple to implement and high availability.

In some embodiments, the base station may add the target capability information corresponding to at least one neighbor base station in the original first information element of the unicast signaling, and send the unicast information to the multi-card terminal.

And/or the base station may add a new second information element to the unicast signaling, and use the second information element to individually indicate target capability information corresponding to at least one neighbor base station, and then send the unicast signaling to the multi-card terminal.

In the embodiment of the present disclosure, the unicast signaling includes but is not limited to RRC Reconfiguration (Radio Resource Control Reconfiguration) signaling.

In the above embodiment, when the multi-card terminal is in the connected state, the base station can send the target capability information corresponding to the neighbor base station to the multi-card terminal through the information element in the unicast signaling, which is simple to implement and has high availability.

In some embodiments, the target capability information may be used to indicate the capability of the neighbor base station to solve the multi-card problem that may exist on the multi-card terminal, that is, the neighbor base station does not consider the actual multi-card problems of the multi-card terminal, and only provide the multi-card problem of the multi-card terminal that can be solved by itself to the base station where the multi-card terminal resides or has been accessed.

In some embodiments, the neighbor base station may indicate whether it has the ability to solve the corresponding multi-card problem respectively through, but not limited to, the bit value corresponding to 7 bits. Each bit sequence corresponds to above-mentioned one multi-card problem. The bit value corresponding to the bit is a first preset value, for example, the first preset value may be 1, and it is determined that the neighbor base station has the ability to solve the multi-card problem. The bit value corresponding to the bit is a second preset value, for example, the second preset value may be 0, and it is determined that the neighbor base station does not have the ability to solve the multi-card problem.

For example, the target capability information of a certain neighbor base station is represented by 7 bits as 1100110, which can be used to indicate that the neighbor base station can solve problem 1, problem 2, problem 5, and problem 6 in the above multi-card problem.

After the base station where the multi-card terminal resides or has accessed acquires the target capability information corresponding to the neighbor base station, it can send the target capability information corresponding to the neighbor base station through broadcast signaling or unicast signaling, so that the multi-card terminal can subsequently perform cell selection at least according to the target capability information corresponding to the neighbor base station.

In the above embodiment, the base station can acquire and send target capability information corresponding to at least one neighbor base station, so that the multi-card terminal can subsequently perform cell selection at least according to the target capability information corresponding to the neighbor base station, with high availability.

Next, the cell selection method provided by the present disclosure will be described from the multi-card terminal side.

Figure 4:
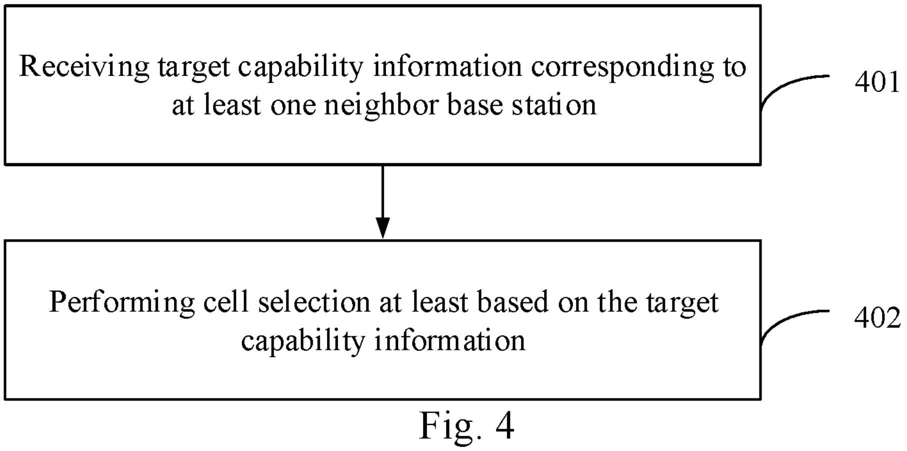
FIG. 4 is a schematic flowchart of another cell selection method according to an embodiment of the present disclosure.

An embodiment of the present disclosure provides a cell selection method. Referring to FIG. 4, FIG. 4 is a flowchart of a cell selection method according to an embodiment, which can be used for a multi-card terminal. The method may include the following steps.

In step 401, target capability information corresponding to at least one neighbor base station is received.

In the embodiment of the present disclosure, the multi-card terminal may receive target capability information corresponding to at least one neighbor base station sent by the base station through broadcast signaling or unicast signaling. Wherein, the target capability information is used to indicate the capability of solving the multi-card problem of the multi-card terminal.

In step 402, cell selection is performed at least based on the target capability information.

In the above embodiment, the multi-card terminal can at least perform cell selection according to the target capability information corresponding to at least one neighbor base station sent by the base station, thereby reducing the multi-card problem of the multi-card terminal, making the cell selection method more flexible and highly available.

Figure 5:
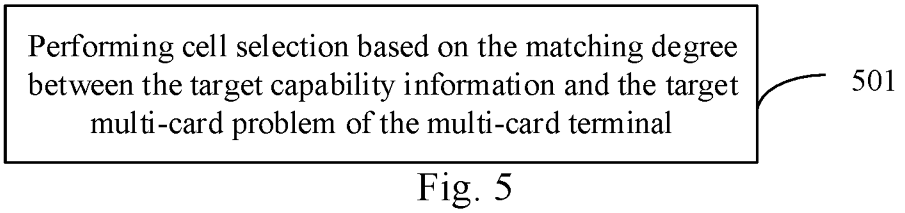
FIG. 5 is a schematic flowchart of another cell selection method according to an embodiment of the present disclosure.

In some embodiments, referring to FIG. 5, FIG. 5 is a flowchart of a cell selection method according to an embodiment, and the method may include the following steps.

In step 501, cell selection is performed based on the matching degree between the target capability information and the target multi-card problem of the multi-card terminal.

In the embodiment of the present disclosure, the target multi-card problem is the existing multi-card problem of the multi-card terminal, that is, the target multi-card problem is a multi-card problem that the multi-card terminal has actually experienced. The multi-card terminal can perform cell selection based on the matching degree between the target capability information corresponding to at least one neighbor base station and the target multi-card problem that it has experienced. The number of the target multi-card problems can be one or more.

In an embodiment of the present disclosure, the multi-card terminal can make the neighbor base station capable of solving the target multi-card problem indicated by the target capability information as the target base station. During cell selection, handover to the target base station is selected.

In another embodiment, all neighbor base stations cannot solve all the target multi-card problems, so the multi-card terminal can select the neighbor base station that can solve the most target multi-card problems as the target base station, so that when performing cell selection, handover to the target base station is selected.

In the above embodiment, the multi-card terminal can perform cell selection based on the target capability information corresponding to the neighbor base stations, thereby reducing the multi-card problem of the multi-card terminal, and making the cell selection method more flexible and highly available.

Figure 6:
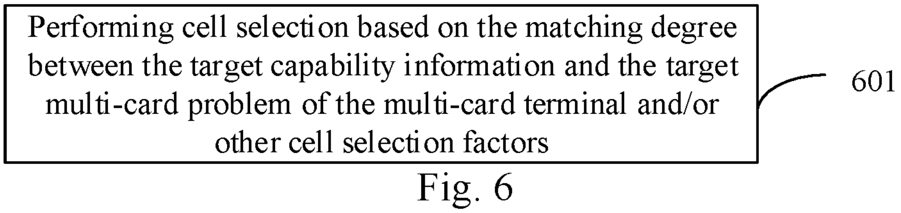
FIG. 6 is a schematic flowchart of another cell selection method according to an embodiment of the present disclosure.

In some embodiments, referring to FIG. 6, FIG. 6 is a flowchart of a cell selection method according to an embodiment, and the method may include the following steps.

In step 601, cell selection is performed based on the matching degree between the target capability information and the target multi-card problem of the multi-card terminal and/or other cell selection factors. That is to say, cell selection is performed based on at least one of the matching degree between the target capability information and the target multi-card problem of the multi-card terminal and other cell selection factors.

In the embodiment of the present disclosure, the target multi-card problem is the existing multi-card problem of the multi-card terminal, that is, the target multi-card problem is a multi-card problem that the multi-card terminal has actually experienced, and other cell selection factors include but not limited to cell signal quality.

In an embodiment of the present disclosure, if it is determined that there are multiple neighbor base stations that can solve all the target multi-card problems according to the target capability information, then one of the neighbor base stations with the best signal quality can be selected as the target base station, so that when performing cell selection, handover to the target base station is selected.

In another embodiment, the matching degree and other cell selection factors may be assigned corresponding weight values, and after the matching degree and other cell selection factors are multiplied by the corresponding weight values respectively, the acquired sum value is determined. The neighbor base station with the maximum sum value is used as the target base station. Therefore, when performing cell selection, handover to the target base station is selected.

In practical applications, the cell selection method at least based on the target capability information corresponding to the neighbor base stations should belong to the protection scope of the present disclosure.

In the above embodiment, the multi-card terminal may perform cell selection according to the matching degree between the target capability information corresponding to at least one neighbor base station and the target multi-card problem of the multi-card terminal and/or other cell selection factors. That is to say, the multi-card terminal may perform cell selection according to at least one of the matching degree between the target capability information corresponding to at least one neighbor base station and the target multi-card problem of the multi-card terminal and other cell selection factors. While reducing the multi-card problem of multi-card terminals, considering other cell handover factors, the cell selection method is more flexible and has high availability.

Figure 7:
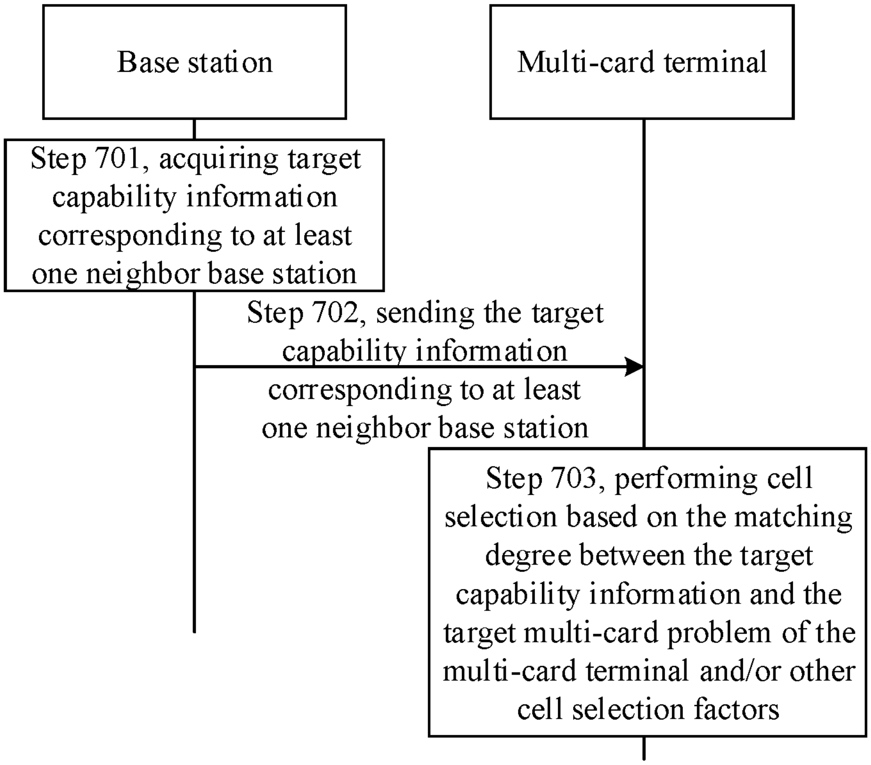
FIG. 7 is a schematic flowchart of another cell selection method according to an embodiment of the present disclosure.

In some embodiments, referring to FIG. 7, FIG. 7 is a flowchart of a cell selection method according to an embodiment, and the method may include the following steps.

In step 701, the base station acquires target capability information corresponding to at least one neighbor base station.

Wherein, the target capability information is used to indicate the capability of solving the multi-card problem of the multi-card terminal. In the embodiment of the present disclosure, the neighbor base station informs the base station where the multi-card terminal resides or has been accessed of the multi-card problem that it can solve.

In step 702, the base station sends the target capability information corresponding to at least one neighbor base station.

In this embodiment of the present disclosure, the base station may broadcast the target capability information corresponding to at least one neighbor base station through broadcast signaling. Or, the base station may send the target capability information corresponding to at least one neighbor base station to the multi-card terminal through unicast signaling when it is determined that the multi-card terminal is in the connected state.

In step 703, the multi-card terminal performs cell selection based on the matching degree between the target capability information and the target multi-card problem of the multi-card terminal and/or other cell selection factors. That is to say, the multi-card terminal performs cell selection based on at least one of the matching degree between the target capability information and the target multi-card problem of the multi-card terminal and other cell selection factors.

The target multi-card problem may be an existing multi-card problem of the multi-card terminal.

Of course, the multi-card terminal can also perform cell selection only according to the matching degree between the target capability information corresponding to at least one neighbor base station and the target multi-card problem of the multi-card terminal (not shown in FIG. 7).

In the above embodiment, while reducing the multi-card problem of the multi-card terminal, other cell handover factors are comprehensively considered, so that the cell selection method is more flexible and has high availability.

Corresponding to the foregoing embodiments of implementation method of the application function, the present disclosure further provides an embodiment of implementation apparatus of the application function.

Figure 8:
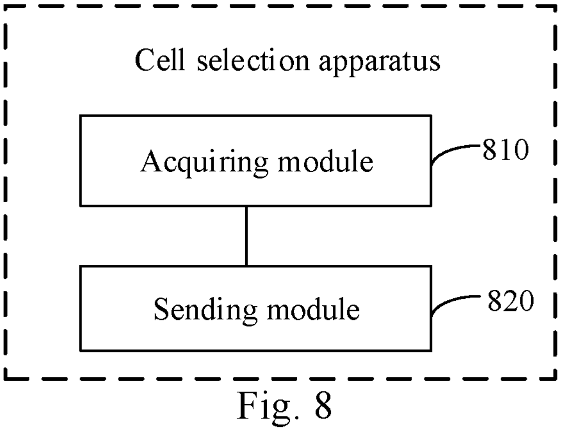
FIG. 8 is a block diagram of a cell selection apparatus according to an embodiment of the present disclosure.

Referring to FIG. 8, FIG. 8 is a block diagram of a cell selection apparatus according to an embodiment. The apparatus is used in a base station, including: an acquiring module 810 configured to acquire target capability information corresponding to at least one neighbor base station; wherein, the target capability information is used to indicate the capability of solving the multi-card problem of the multi-card terminal; a sending module 820 configured to send the target capability information corresponding to the at least one neighbor base station.

In some embodiments, the sending module includes: a broadcast sub-module configured to broadcast the target capability information corresponding to the at least one neighbor base station through broadcast signaling.

In some embodiments, the broadcast signaling is used to broadcast a target system message carrying target capability information corresponding to the at least one neighbor base station.

In some embodiments, the target system message includes at least one of the following: system information blocks SIB5, SIB4, SIB5, and SIB11.

In some embodiments, the sending module includes: a unicast sub-module configured to, in response to determining that the multi-card terminal is in a connected state, send the target capability information corresponding to the at least one neighbor base station to the multi-card terminal through unicast signaling.

In some embodiments, the unicast sub-module includes: a first execution unit, configured to add the target capability information corresponding to the at least one neighbor base station in the first information element of the unicast signaling, and send the unicast signaling to the multi-card terminal; and/or a second execution unit, configured to add a second information element for indicating the target capability information corresponding to the at least one neighbor base station in the unicast signaling, and send the unicast signaling to the multi-card terminal. That is to say, the unicast sub-module includes at least one of the first execution unit and the second execution unit.

In some embodiments, the unicast signaling includes radio resource control reconfiguration signaling.

Figure 9:
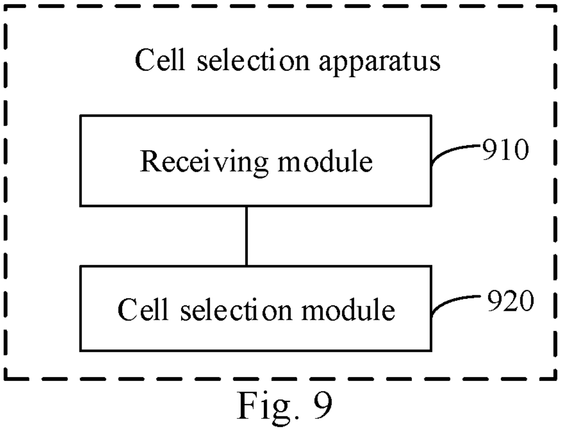
FIG. 9 is a block diagram of another cell selection apparatus according to an embodiment of the present disclosure.

Referring to FIG. 9, FIG. 9 is a block diagram of another cell selection apparatus according to an embodiment. The apparatus is used in a multi-card terminal, including: a receiving module 910 configured to receive target capability information corresponding to at least one neighbor base station sent by the base station; wherein, the target capability information is used to indicate the ability to solve the multi-card problem of the multi-card terminal; a cell selection module 920 configured to perform cell selection at least based on the target capability information.

In some embodiments, the cell selection module includes: a first selection sub-module configured to perform cell selection based on the matching degree between the target capability information and the target multi-card problem of the multi-card terminal.

In some embodiments, the cell selection module includes: a second selection sub-module configured to perform cell selection based on the matching degree between the target capability information and the target multi-card problem of the multi-card terminal and/or other cell selection factors. That is to say, the second selection sub-module is configured to perform cell selection based on at least one of the matching degree between the target capability information and the target multi-card problem of the multi-card terminal and other cell selection factors.

In some embodiments, the other cell selection factors include at least: cell signal quality.

For the apparatus embodiments, since they basically correspond to the method embodiments, reference may be made to the partial descriptions of the method embodiments for related parts. The apparatus embodiments described above are only schematic, wherein the units described as separate components may be or may not be physically separated, and the components shown as units may be or may not be physical units, that is, they may be located in one place, or they can be distributed over multiple network units. Some or all of the modules can be selected according to actual needs to achieve the purpose of the solution of the present disclosure. Those of ordinary skill in the art can understand and implement it without inventive effort.

Correspondingly, the present disclosure also provides a computer-readable storage medium, where a computer program is stored in the storage medium, and the computer program is used to execute any one of the cell selection methods described above for the base station side.

Correspondingly, the present disclosure also provides a computer-readable storage medium, where a computer program is stored in the storage medium, and the computer program is used to execute any one of the cell selection methods described above for a multi-card terminal side.

Correspondingly, the present disclosure also provides a cell selection device, comprising: a processor; a memory for storing processor-executable instructions; wherein, the processor is configured to execute any one of the cell selection methods described above at the base station side.

Figure 10:
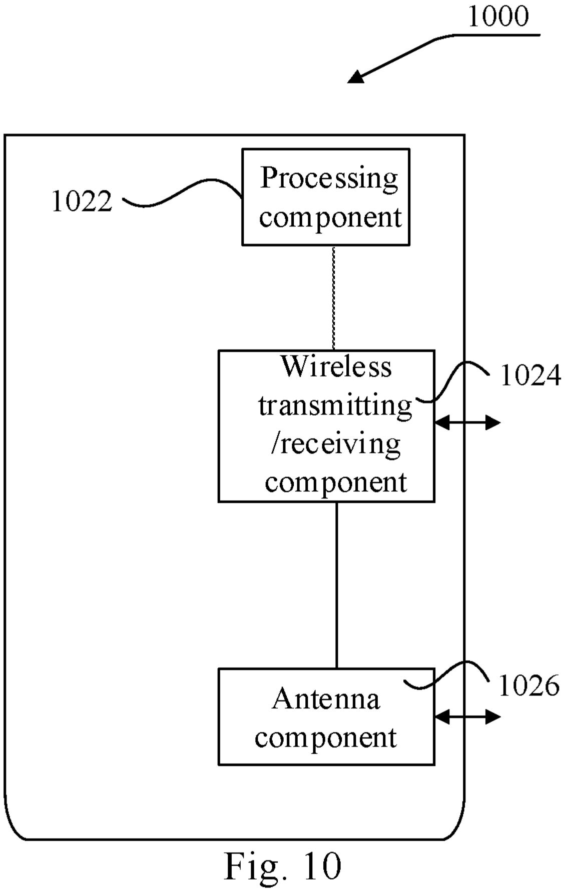
FIG. 10 is a schematic structural diagram of a cell selection apparatus according to an embodiment of the present disclosure.

As shown in FIG. 10, FIG. 10 is a schematic structural diagram of a cell selection apparatus 1000 according to an embodiment. The apparatus 1000 may be provided as a base station. Referring to FIG. 10, apparatus 1000 includes a processing component 1022, a wireless transmitting/receiving component 1024, an antenna component 1026, and a signal processing portion specific to a wireless interface, and the processing component 1022 may further include one or more processors.

One of the processors in the processing component 1022 can be configured to perform any of the cell selection methods described above.

Correspondingly, the present disclosure also provides a cell selection apparatus, including: a processor; a memory for storing processor-executable instructions; wherein, the processor is configured to execute any one of the cell selection methods described above on the multi-card terminal side.

Figure 11:
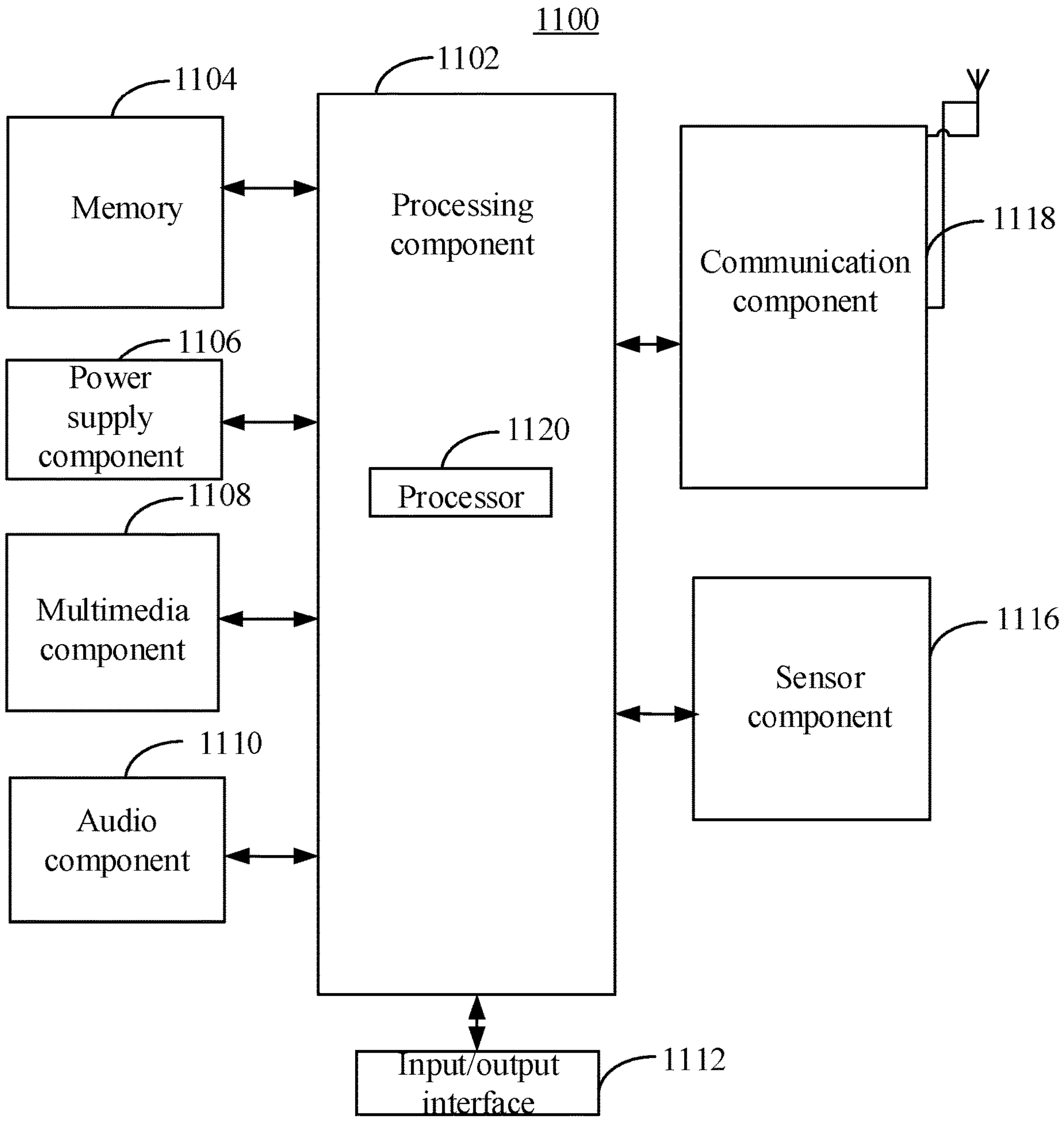
FIG. 11 is a schematic structural diagram of another cell selection apparatus according to an embodiment of the present disclosure.

FIG. 11 is a block diagram of an electronic device 1100 according to an embodiment. For example, the electronic device 1100 may be a multi-card terminal including multiple SIM cards, such as a mobile phone, a tablet computer, an e-book reader, a multimedia player, a wearable device, a vehicle-mounted terminal, an ipad, and a smart TV.

Referring to FIG. 11, the electronic device 1100 may include one or more of the following components: a processing component 1102, a memory 1104, a power supply component 1106, a multimedia component 1108, an audio component 1110, an input/output (I/O) interface 1112, a sensor component 1116, and communication component 1118.

The processing component 1102 generally controls the overall operation of the electronic device 1100, such as operations associated with display, phone calls, data communications, camera operations, and recording operations. The processing component 1102 can include one or more processors 1120 to execute instructions so as to perform all or part of the steps of the cell selection method described above. Additionally, processing component 1102 may include one or more modules that facilitate interaction between processing component 1102 and other components. For example, processing component 1102 may include a multimedia module to facilitate interaction between multimedia component 1108 and processing component 1102. For another example, the processing component 1102 may read executable instructions from the memory to implement the steps of the cell selection method provided by the above embodiments.

The memory 1104 is configured to store various types of data to correspond to operations at the electronic device 1100. Examples of such data include instructions for any application or method operating on the electronic device 1100, contact data, phonebook data, messages, pictures, videos, and the like. Memory 1104 may be implemented by any type of volatile or non-volatile storage device or combination thereof, such as static random access memory (SRAM), electrically erasable programmable read only memory (EEPROM), erasable Programmable Read Only Memory (EPROM), Programmable Read Only Memory (PROM), Read Only Memory (ROM), Magnetic Memory, Flash Memory, Magnetic or Optical Disk.

Power supply component 1106 provides power to various components of electronic device 1100. Power supply component 1106 may include a power management system, one or more power supplies, and other components associated with generating, managing, and distributing power to electronic device 1100.

The multimedia component 1108 includes a display screen that provides an output interface between the electronic device 1100 and the user. In some embodiments, the multimedia component 1108 includes a front-facing camera and/or a rear-facing camera. When the electronic device 1100 is in an operation mode, such as a shooting mode or a video mode, the front camera and/or the rear camera may receive external multimedia data. Each of the front and rear cameras can be a fixed optical lens system or have focal length and optical zoom capability.

Audio component 1110 is configured to output and/or input audio signals. For example, audio component 1110 includes a microphone (MIC) that is configured to receive external audio signals when electronic device 1100 is in operating modes, such as call mode, recording mode, and voice recognition mode. The received audio signal may be further stored in memory 1104 or transmitted via communication component 1118. In some embodiments, audio component 1110 also includes a speaker for outputting audio signals.

The I/O interface 1112 provides an interface between the processing component 1102 and a peripheral interface module, which may be a keyboard, a click wheel, a button, or the like. These buttons may include, but are not limited to: home button, volume buttons, start button, and lock button.

The sensor component 1116 includes one or more sensors for providing various aspects of the status assessment of the electronic device 1100. For example, the sensor component 1116 can detect the open/closed state of the electronic device 1100 and the relative positioning of the components, for example the components are display and keypad of the electronic device 1100. The sensor component 1116 can also detect the change in position of the electronic device 1100 or one component of the electronic device 1100, presence or absence of user contact with the electronic device 1100, orientation or acceleration/deceleration of the electronic device 1100 and change in the temperature of the electronic device 1100. Sensor component 1116 may include a proximity sensor configured to detect the presence of nearby objects without any physical contact. Sensor component 1116 may also include a light sensor, such as a CMOS or CCD image sensor, for use in imaging applications. In some embodiments, the sensor component 1116 may also include an acceleration sensor, a gyroscope sensor, a magnetic sensor, a pressure sensor, or a temperature sensor.

Communication component 1118 is configured to facilitate wired or wireless communications between electronic device 1100 and other devices. The electronic device 1100 may access a wireless network based on a communication standard, such as Wi-Fi, 2G, 3G, 4G, 5G or 6G, or a combination thereof. In one embodiment, the communication component 1118 receives broadcast signals or broadcast related information from an external broadcast management system via a broadcast channel. In an embodiment, the communication component 1118 also includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an embodiment, electronic device 1100 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic elements, and is used to perform the cell selection method described above.

In an embodiment, a non-transitory machine-readable storage medium including instructions is also provided, such as a memory 1104 including instructions executable by the processor 1120 of the electronic device 1100 to complete the cell selection method described above. For example, the non-transitory computer-readable storage medium may be ROM, random access memory (RAM), CD-ROM, magnetic tape, floppy disk, optical data storage device, and the like.

Other embodiments of the present disclosure will readily occur to those skilled in the art upon consideration of the specification and practice of the disclosure herein. This disclosure is intended to cover any variations, uses, or adaptations of this disclosure that follow the general principles of this disclosure and include common general knowledge or techniques in the technical field not disclosed by this disclosure. The specification and embodiments are to be regarded as exemplary only, with the true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A cell selection method, wherein the method is applied to a base station, and comprises:

acquiring target capability information corresponding to at least one neighbor base station; wherein the target capability information indicates a capability of solving a multi-card problem of a multi-card terminal; and sending the target capability information corresponding to the at least one neighbor base station, wherein sending the target capability information corresponding to the at least one neighbor base station comprises:

in response to determining that the multi-card terminal is in a connected state, sending the target capability information corresponding to the at least one neighbor base station to the multi-card terminal through a unicast signaling, wherein sending the target capability information corresponding to the at least one neighbor base station to the multi-card terminal through the unicast signaling comprises at least one of the following:

adding the target capability information corresponding to the at least one neighbor base station in a first information element of the unicast signaling, and sending the unicast signaling to the multi-card terminal; or adding a second information element that indicates the target capability information corresponding to the at least one neighbor base station to the unicast signaling, and sending the unicast signaling to the multi-card terminal.

2. The method according to claim 1, wherein sending the target capability information corresponding to the at least one neighbor base station comprises:

broadcasting the target capability information corresponding to the at least one neighbor base station through a broadcast signaling.

3. The method according to claim 2, wherein the broadcast signaling is configured to broadcast a target system message carrying the target capability information corresponding to the at least one neighbor base station.

4. The method according to claim 3, wherein the target system message comprises at least one of: system information blocks SIB3, SIB4, SIB5, and SIB11.

5. The method according to claim 1, wherein the unicast signaling comprises a radio resource control reconfiguration signaling.

6. A cell selection apparatus, comprising:

a processor;

a memory for storing processor-executable instructions;

wherein the instructions are executed by the processor such that the processor performs the following operations:

acquiring target capability information corresponding to at least one neighbor base station; wherein, the target capability information indicates a capability of solving a multi-card problem of a multi-card terminal; and sending the target capability information corresponding to the at least one neighbor base station, wherein sending the target capability information corresponding to the at least one neighbor base station comprises:

in response to determining that the multi-card terminal is in a connected state, sending the target capability information corresponding to the at least one neighbor base station to the multi-card terminal through a unicast signaling, wherein sending the target capability information corresponding to the at least one neighbor base station to the multi-card terminal through the unicast signaling comprises at least one of the following:

adding the target capability information corresponding to the at least one neighbor base station in a first information element of the unicast signaling, and sending the unicast signaling to the multi-card terminal; or adding a second information element that indicates the target capability information corresponding to the at least one neighbor base station to the unicast signaling, and sending the unicast signaling to the multi-card terminal.

7. The apparatus according to claim 6, wherein sending the target capability information corresponding to the at least one neighbor base station comprises:

broadcasting the target capability information corresponding to the at least one neighbor base station through a broadcast signaling.

8. The apparatus according to claim 7, wherein the broadcast signaling is configured to broadcast a target system message carrying the target capability information corresponding to the at least one neighbor base station.

9. The apparatus according to claim 8, wherein the target system message comprises at least one of: system information blocks SIB3, SIB4, SIB5, and SIB11.

10. The apparatus according to claim 6, wherein the unicast signaling comprises a radio resource control reconfiguration signaling.

* * * * *